(12) United States Patent
Yau

(10) Patent No.: US 9,531,787 B2
(45) Date of Patent: Dec. 27, 2016

(54) SYSTEM AND METHOD FOR MANAGING AND MONITORING INFORMATION USING ENDPOINT PAIRS

(75) Inventor: Hintat Henrick Yau, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 55 days.

(21) Appl. No.: 13/523,757

(22) Filed: Jun. 14, 2012

(65) Prior Publication Data

US 2013/0086150 A1    Apr. 4, 2013

Related U.S. Application Data

(60) Provisional application No. 61/541,819, filed on Sep. 30, 2011.

(51) Int. Cl.
*H04L 29/08* (2006.01)
(52) U.S. Cl.
CPC .............. *H04L 67/06* (2013.01); *H04L 67/14* (2013.01)
(58) Field of Classification Search
CPC .... H04L 67/14; H04L 67/06; H04L 29/06027; H04L 65/1043; H04L 65/1006; H04L 65/1009; H04M 7/006
USPC ................................................ 709/203, 227
See application file for complete search history.

(56) References Cited

U.S. PATENT DOCUMENTS

| | | | | |
|---|---|---|---|---|
| 2002/0133588 A1* | 9/2002 | Doyle et al. | ................... | 709/224 |
| 2004/0210657 A1* | 10/2004 | Narayanan | .............. | H04L 29/06 709/227 |
| 2004/0252646 A1* | 12/2004 | Adhikari | ................. | H04L 43/12 370/252 |
| 2004/0252694 A1* | 12/2004 | Adhikari | ................. | H04L 41/12 370/395.2 |
| 2007/0280253 A1* | 12/2007 | Rooholamini | .......... | H04L 45/00 370/395.2 |
| 2008/0259907 A1* | 10/2008 | Kumarasamy et al. | ...... | 370/352 |
| 2009/0059848 A1* | 3/2009 | Khetawat | .......... | H04L 29/12367 370/328 |
| 2009/0073894 A1* | 3/2009 | Nimon | .................... | H04L 12/18 370/254 |
| 2009/0131085 A1* | 5/2009 | Shaffer | ............... | H04L 12/1818 455/466 |
| 2009/0187667 A1* | 7/2009 | Donatelli | ................ | H04L 29/06 709/229 |
| 2010/0091676 A1* | 4/2010 | Moran | .................... | H04L 47/10 370/252 |
| 2010/0287274 A1* | 11/2010 | Martinez | ............... | H04L 65/602 709/224 |
| 2011/0069626 A1* | 3/2011 | Sun | .................... | H04L 12/2697 370/252 |

(Continued)

*Primary Examiner* — Philip Chea
*Assistant Examiner* — Mohammed Ahmed
(74) *Attorney, Agent, or Firm* — Tucker Ellis LLP

(57) ABSTRACT

Described herein are systems and methods for managing and monitoring information using endpoint pairs. The system includes a computer having an application server, said application server having a user interface. The user interface provides input selections used for tying two endpoints together as a single entity. One endpoint is used for sending messages and another endpoint is used for receiving messages. Tying the endpoints together as a single entity provides for a higher level of message management in the application server.

26 Claims, 8 Drawing Sheets

(56) References Cited

U.S. PATENT DOCUMENTS

| | | | | |
|---|---|---|---|---|
| 2011/0110232 A1* | 5/2011 | Abraham | ............ | H04L 41/5025 370/235 |
| 2011/0110241 A1* | 5/2011 | Atkinson et al. | ............. | 370/242 |
| 2011/0110381 A1* | 5/2011 | Atkinson | .............. | H04L 47/125 370/419 |
| 2011/0271002 A1* | 11/2011 | Martinez | ............. | H04L 65/4084 709/231 |
| 2013/0073628 A1* | 3/2013 | Barber | .................... | G06F 21/31 709/204 |
| 2013/0086150 A1* | 4/2013 | Yau | ........................ | H04L 67/14 709/203 |
| 2013/0148508 A1* | 6/2013 | Sun et al. | .................... | 370/241 |

* cited by examiner

SYSTEM AND METHOD FOR MANAGING AND MONITORING INFORMATION USING ENDPOINT PAIRS

CLAIM OF PRIORITY

This application claims the benefit of priority to U.S. Provisional Patent Application titled "SYSTEM AND METHOD FOR MANAGING AND MONITORING INFORMATION USING ENDPOINT PAIRS"; Application No. 61/541,819; filed Sep. 30, 2011, which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and application servers, and are particularly related to systems and methods for managing and monitoring information using endpoint pairs.

BACKGROUND

Endpoints refer to physical communication addresses between software systems, with a communication being carried out according to the communication or transport protocol supported. There are a variety of different communication protocols. Common examples include FTP, HTTP, MLLP, JMS and Web Service. When two software systems communicate, they can use a single endpoint that resides on one of the systems, or they can use two endpoints, with one endpoint on each system. For example, in a first model, when using a single endpoint, the same physical endpoint needs to allow both systems to initiate requests or transmit responses to another system, beyond the normal handshake communication as described by the transport protocol. Such transport protocols are described as bi-directional protocols. An example of a bi-directional protocol is MLLP.

In a second model, when using two separate endpoints (one on each system), the transport protocols supported on the endpoints can be uni-directional protocols, where only the initiating system can transmit requests to the receiving system, and the receiving system sends a response using the other endpoint. An example of a uni-directional protocol is FTP. Some protocols can support both bi-directional and uni-directional exchanges, such as Web Services.

Managing and monitoring endpoint status and activities are crucial to understanding the health of software systems. Typically, industry software manages and monitors information using endpoints only, and does not specifically organize by pairs of related endpoints for communicating a specific set of documents and functional acknowledgements. While such monitoring is effective for bi-directional endpoints, it is inadequate when the systems communicate using pairs of uni-directional endpoints. These are the areas that embodiments of the invention are intended to address.

SUMMARY

Described herein are systems and methods for managing and monitoring information using endpoint pairs. The system includes a computer having an application server, said application server having a user interface. The user interface provides input selections used for tying two related endpoints together as a single entity, where one endpoint is used for sending messages and another endpoint is used for receiving messages. Tying the endpoints together as a single entity provides for a higher level managing and monitoring of information in the application server.

DETAILED DESCRIPTION

In accordance with an embodiment of the invention, the two different models are unified as an endpoint pair to facilitate management and monitoring of endpoint activities. An endpoint pair refers to two endpoints, where each endpoint resides on its respective software system, and is used for communication between the two systems using uni-directional protocols. As described above, industry software typically manages and monitors information using endpoints only, and does not specifically organize by pairs of related endpoints for communicating a specific set of documents and/or functional acknowledgements. However, in accordance with an embodiment of the invention, by modeling the two related endpoints as an endpoint pair, the same model for managing and monitoring an endpoint can be used for an endpoint pair. This allows a system monitoring component to expose endpoint and endpoint pair information in the same way, the enabling and disabling of the endpoint pair, visualizing supported documents for the endpoint pair, and displaying related monitoring data (message counts and actual messages) for the endpoint pair.

Figure 1:
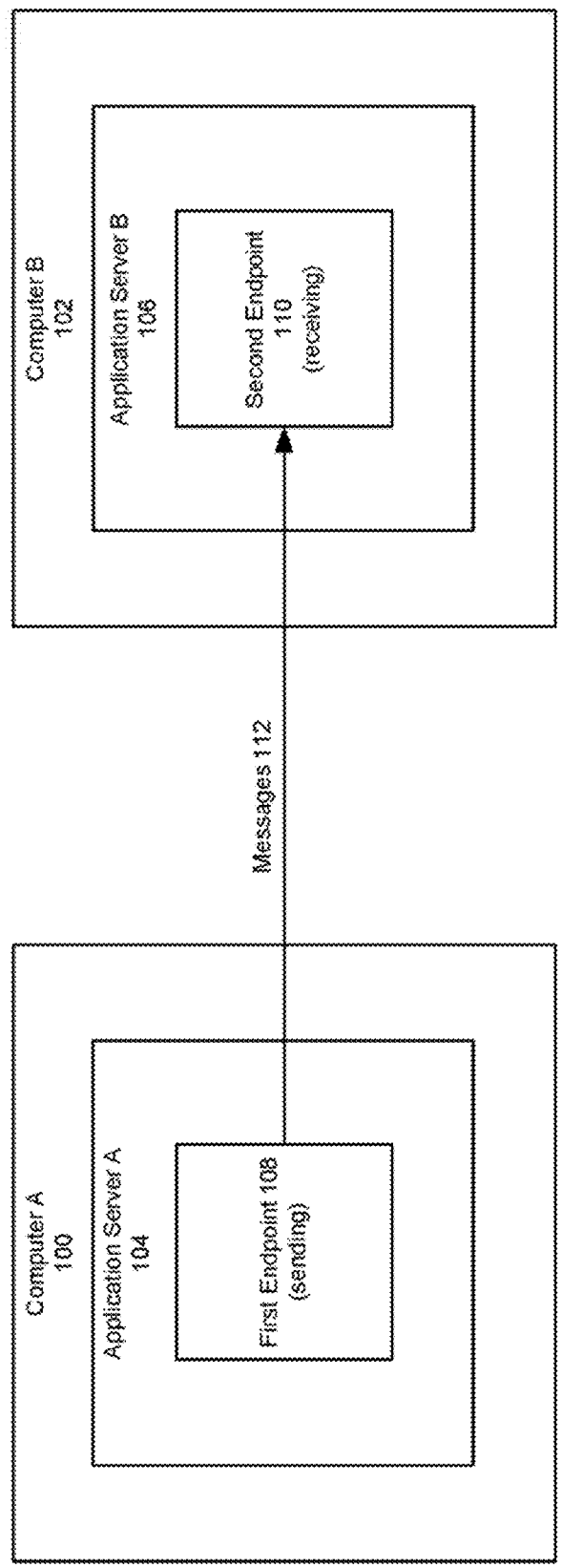
FIG. 1 shows an exemplary system for managing and monitoring information using endpoints, in accordance with an embodiment of the invention.

FIG. 1 shows an exemplary system for managing and monitoring information using endpoints. As shown in FIG. 1, a first computer 100, computer A, includes an application server A 104, which includes a first endpoint 108. The first endpoint 108 sends messages 112 with a second endpoint 110 located on a second application server B 106 on computer B 102. The two endpoints communicate using a uni-directional transport protocol, in which the transport protocol can be the same or different for each endpoint. For example, the first and second endpoints can communicate using a file transport protocol (FTP) or a File protocol.

As shown in FIG. 1, the two endpoints are not modeled as a single management unit. Thus, the endpoints are not specifically organized as a single entity, and the communications between the endpoints are managed and monitored for each endpoint separately.

Figure 2:
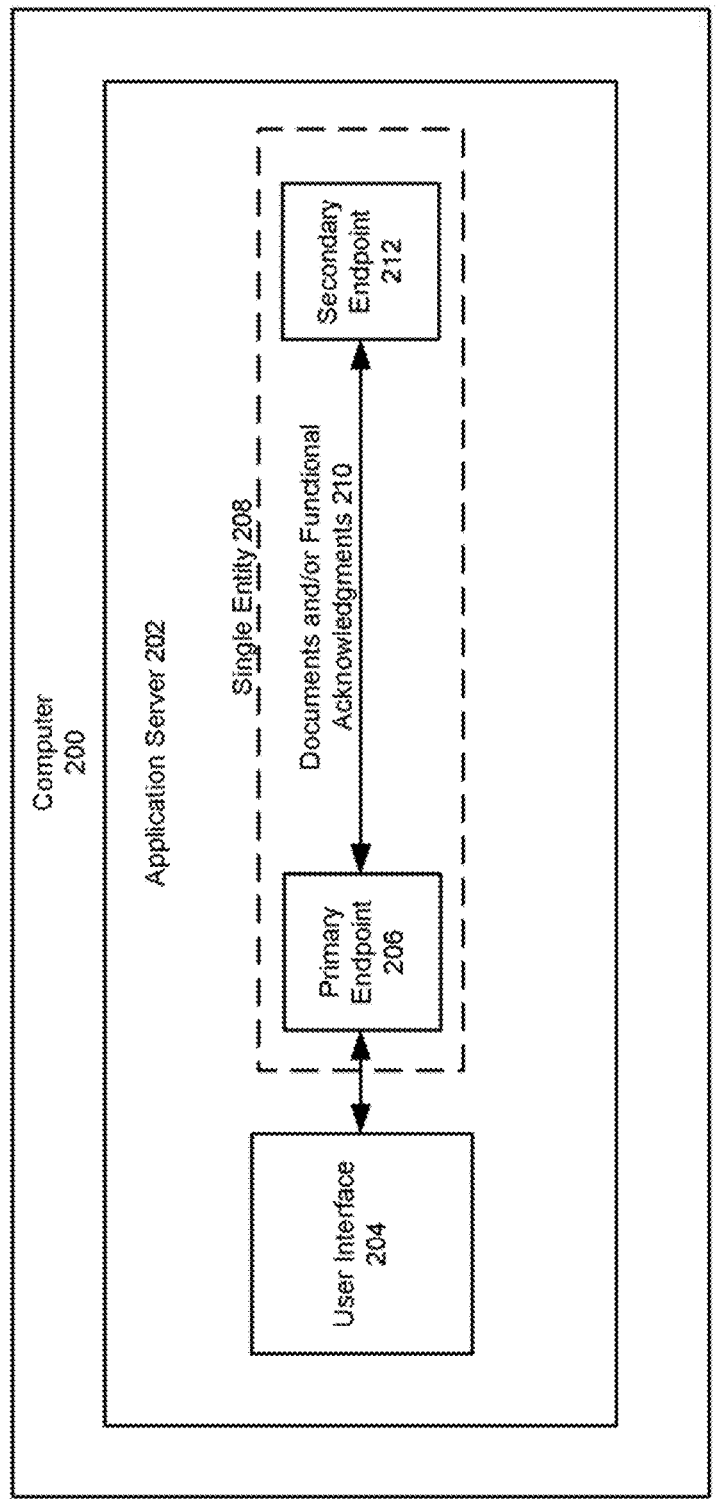
FIG. 2 shows an exemplary system for managing and monitoring information using endpoint pairs, in accordance with an embodiment of the invention.

FIG. 2 shows an exemplary system for managing and monitoring information using endpoint pairs, in accordance with an embodiment of the invention, where the endpoints are located on the same application server. As shown in FIG. 2, a computer 200 includes an application server 202, which includes a user interface 204 and a primary endpoint 206. The primary endpoint communicates with a secondary endpoint 212, also located on the application server 202.

The user interface 204 can be used to tie the endpoints together as a single entity 208. When the inputs are tied together as a single entity, data configuration and message processing in the application server is possible in view of the pair of endpoints. For example, a specific set of documents and/or functional acknowledgements 210 can be communicated between the pair of endpoints, and these documents and functional acknowledgements can be visualized, along with related monitoring data such as message counts and actual messages. Additionally, tying the endpoints together allows for the enabling and disabling of the related endpoint pair.

Figure 3:
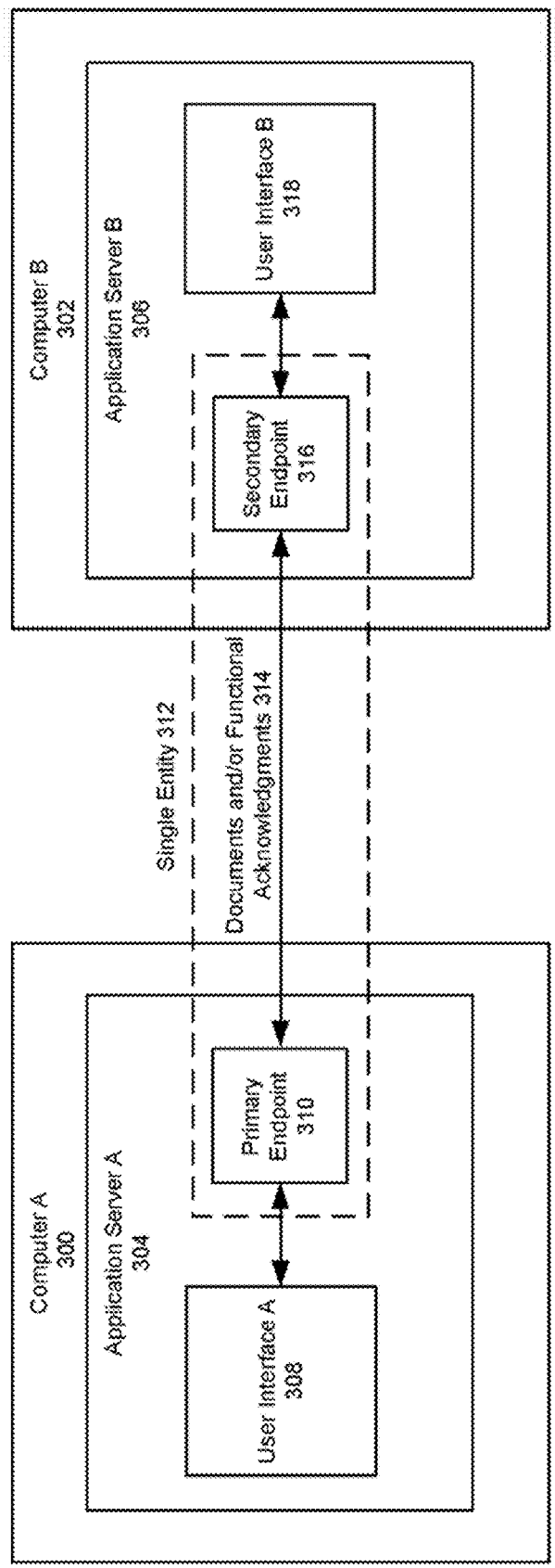
FIG. 3 shows an exemplary system for managing and monitoring information using endpoint pairs, in accordance with an alternate embodiment of the invention.

FIG. 3 shows an exemplary system for managing and monitoring information using endpoint pairs, in accordance with an embodiment of the invention, where the endpoints are located on separate application servers. As shown in FIG. 3, a first computer 300 (computer A), includes an application server A 304, which includes a user interface A 308 and a primary endpoint 310. The primary endpoint 310 communicates with a secondary endpoint 316 located on a second application server B 306, on a second computer 302 (computer B). Application server B 306 includes a user interface B 318.

As shown in FIG. 3, user interface A 308 is used to tie the endpoints together. However, either user interface can be used. When the endpoints are tied together as a single entity 312, the endpoint pair uses a uni-directional transport protocol (e.g., File or FTP) to communicate documents and/or functional acknowledgments 314, and each endpoint can use a different transport protocol. For example, the primary endpoint 310 can use FTP, while the secondary endpoint 316 can use a File transport protocol.

Figure 4:
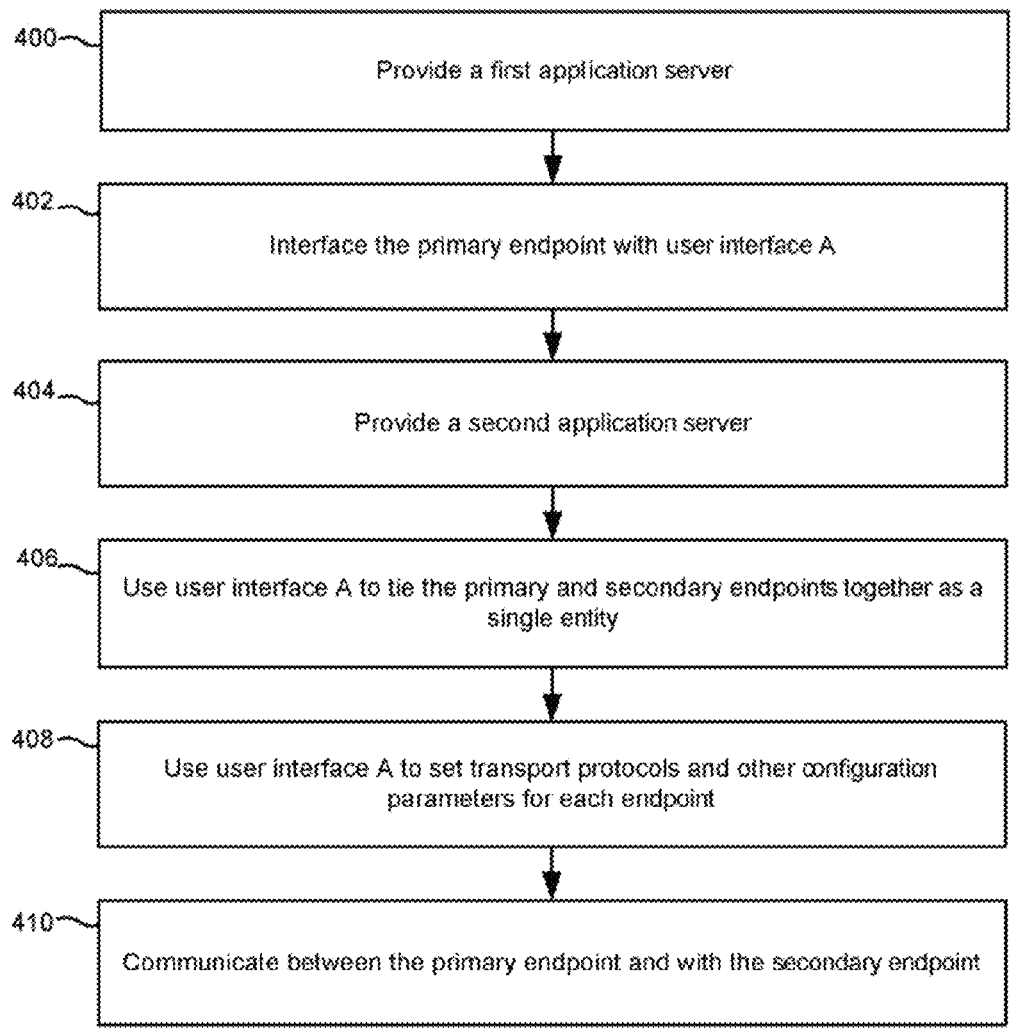
FIG. 4 shows a flowchart of a method in accordance with an embodiment of the invention, for managing and monitoring information using endpoint pairs.

As described above, when the primary and secondary endpoints are tied together as a single entity 312, data configuration and message processing in the application server is possible in view of the endpoint pair. For example, transport protocols and other configuration parameters can be defined per endpoint using interface A 308. Additionally, a set of configuration parameters can be set for the primary endpoint 310, and a separate set of configuration parameters can be set for the secondary endpoint 316. Once each endpoint has been configured, a specific set of documents and/or functional acknowledgements 314 can be communicated between the endpoint pair FIG. 4 shows a flowchart of a method in accordance with an embodiment of the invention, for managing and monitoring information using endpoint pairs. As shown in FIG. 4, at step 400 a first application server is provided. The application server includes a user interface A and a primary endpoint. At step 402, user interface A interfaces with the primary endpoint. At step 404, a second application server is provided, which includes a user interface B and a secondary endpoint. At step 406, user interface A is used to tie the primary and secondary endpoints together as a single entity. Alternatively, user interface B can be used to tie the endpoints together. When the primary and secondary endpoints are tied together as a single entity, data configuration and message processing in the application server is possible in view of the pair of endpoints. At step 408, user interface A is used to set transport protocols and other configuration parameters for each endpoint. At step 410, the primary endpoint communicates a specific set of documents and/or functional acknowledgements with the secondary endpoint.

Figure 5:
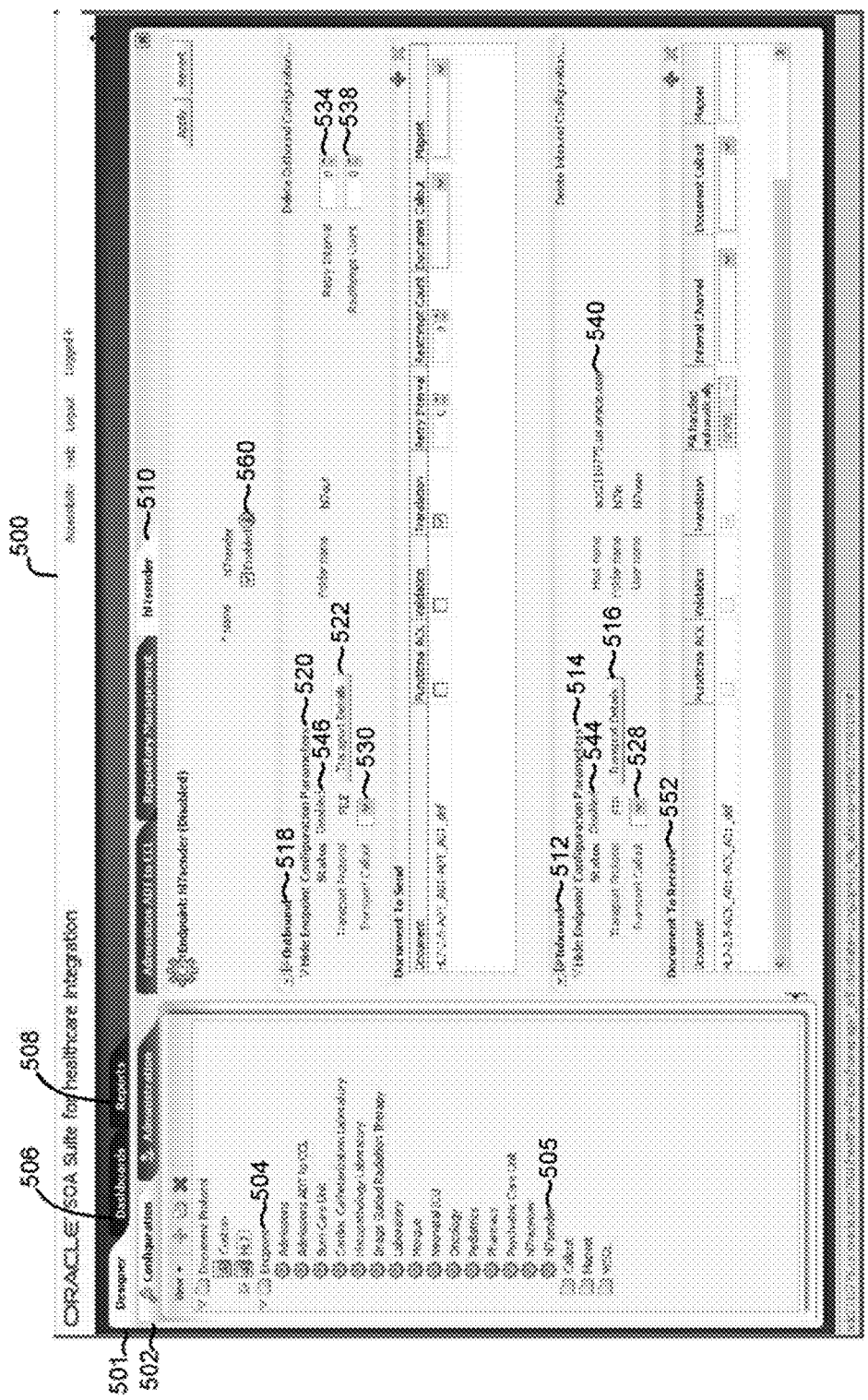
FIG. 5 shows an exemplary user interface for configuring an endpoint as an endpoint pair, in accordance with an embodiment of the invention.

FIG. 5 shows an exemplary user interface for configuring an endpoint as an endpoint pair with two different physical endpoints for communication, in accordance with an embodiment of the invention. As shown in FIG. 5, the user interface 500 includes a designer tab 501, a dashboards tab 506 that includes a graphical user interface that displays statistics for endpoints and endpoint pairs, and a reports tab 508 that includes a graphical user interface that displays related monitoring data (message counts and actual messages) and other information for an endpoint pair.

When the designer tab 501 is selected, a configuration panel 502 is displayed. The configuration panel 502 includes multiple endpoints 504. Selecting an endpoint, for example the hl7sender 505 endpoint, displays configuration parameters for the selected endpoint in an endpoint pair review panel 510. The selected endpoint is shown having an inbound section 512 and an outbound section 518, where the inbound section 512 can correspond to a primary endpoint, and the outbound section 518 can correspond to a secondary endpoint.

As shown in FIG. 5, the hl7sender 505 endpoint includes two related endpoints (a primary endpoint represented in the inbound section 512, and a secondary endpoint represented in the outbound section 518) that are displayed in the endpoint pair review panel 510. The inbound section 512 displays configuration parameters for sending a communication, and the outbound section 518 displays configuration parameters for receiving a communication. The inbound section 512 can be minimized to hide the configuration parameters in that section by selecting the hide endpoint configuration parameter option 514. Similarly, the outbound section 518 can be minimized to hide the configuration parameters in that section by selecting the hide endpoint configuration parameter option 520.

The inbound and outbound sections can display configuration parameters that include, for example, configuration parameters to: set a transport protocol (516, 522), set a transport callout (528, 530), set a retry interval 534, and set a reattempt count 538. The inbound and outbound sections can also display other information or parameters, such as a host name 540, and a status indicator (544, 546) that indicates whether the endpoint is enabled or disabled.

Additionally, configuration parameters relating to sending and or receiving documents or other information can be selected within the endpoint pair review panel 510. For example, a Documents to Receive section 552 can include configuration parameters used to: select whether to receive a functional acknowledgement, select whether the document communicated is validated, and to select whether the document communicated is translated. Other configuration parameters relating to sending or receiving documents or other information that can be selected include: a drop down menu used to select an internal channel, and drop down menus used to select a document callout and a mapset.

As described above, the user interface can be used to tie together two related endpoints as a single entity. For example, when an endpoint pair is selected from the configuration panel 502, the endpoint used for sending messages can be tied to the endpoint used for receiving messages by selecting the Enabled option 560 in the endpoint pair review panel 510. The endpoints can be untied, and thus no longer operate as a single entity, by deselecting the Enabled option 560.

When the endpoints are tied together, the endpoint pair uses a uni-directional transport protocol (FTP or File), and the transport protocol can be different for each endpoint. The transport protocol for the endpoint pair can be selected in the inbound and outbound sections respectively (512, 518). The user interface can be used to set the transport protocol for the outbound section 518 to be the same as the transport protocol of the inbound section 512 when the transport protocol relating to the inbound section 512 is selected. Alternatively, the user interface 500 can be used to modify the transport protocol used in the outbound section 518 to be different from the transport protocol used in the inbound section 512. For example, as shown in FIG. 5, outbound section 518 uses a FILE protocol, while the inbound section 512 uses a FTP protocol.

The user interface can further be used to indicate whether the configuration parameters for the inbound and/or outbound sections have been selected. When the configuration parameters for the inbound section 512 have been selected, the user interface 500 can automatically set the configuration parameters in the outbound section 518 to be the same as the configuration parameters in the inbound section 512. Alternatively, the user interface can be used to select and/or modify the configuration parameters in the inbound and outbound section to be the same or different. When the endpoints are not tied together, the endpoints use a bi-directional transport, and the configuration parameters for each endpoint are the same.

Figure 6:
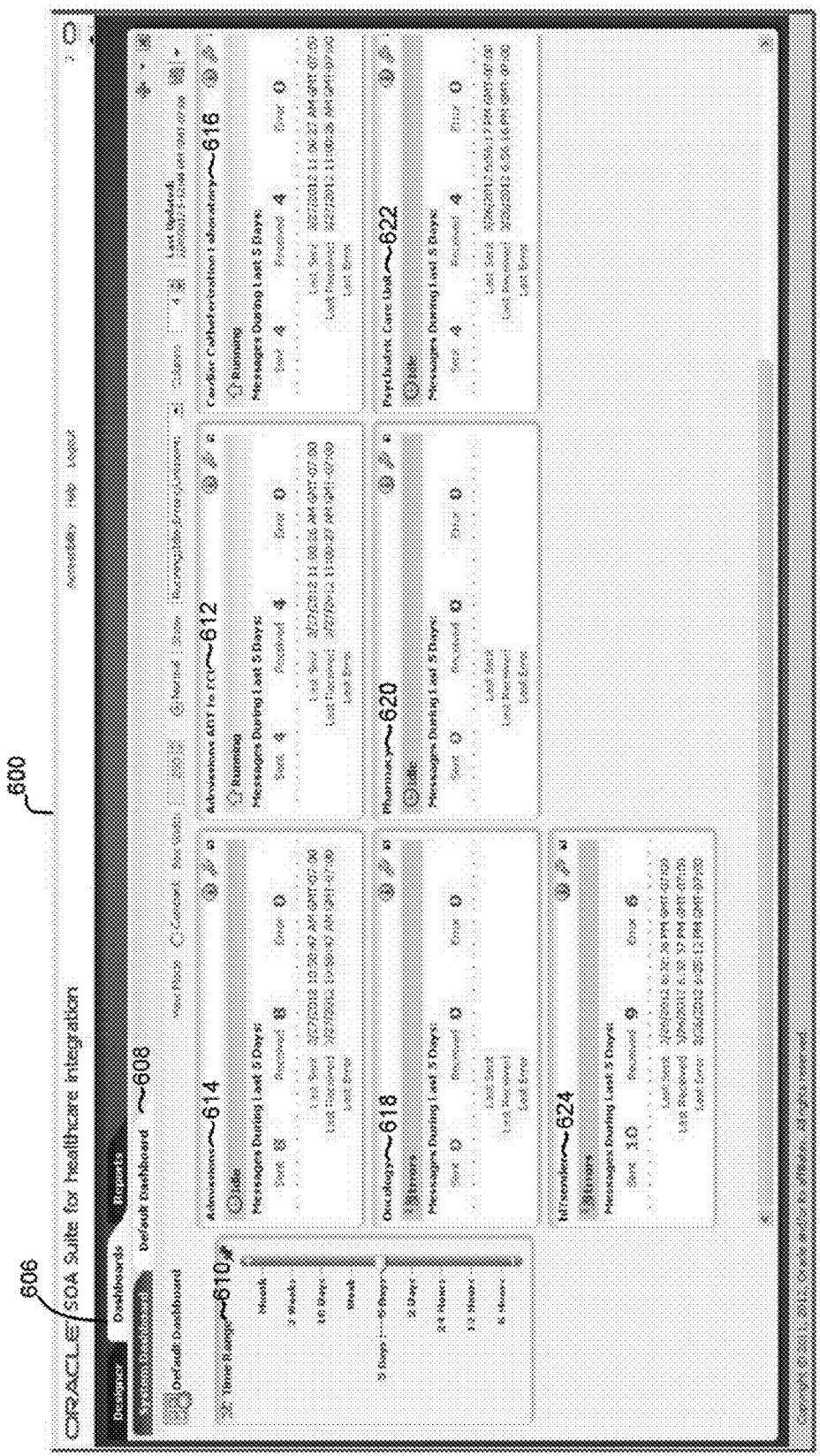
FIG. 6 shows an exemplary user interface for monitoring endpoints and endpoint pairs, in accordance with an embodiment of the invention.

FIG. 6 shows an exemplary user interface for monitoring endpoints and endpoint pairs, in accordance with an embodiment of the invention. As shown in FIG. 6, the user interface 600 includes a dashboards tab 606. When the dashboards tab 606 is selected, a dashboard view 608 is displayed that includes a section for each endpoint and endpoint pair (612, 614, 616, 618, 620, 622 and 624). Each section displays statistics for the endpoint or the endpoint pair contained within that section, where statistics can include a number of messages sent, a number of messages received, and a number of errors in sending or receiving messages. The statics shown are example statistics, and other statics can be displayed, such as an average number of messages sent or received.

Further displayed on the dashboard view 608 is a time range panel 610 that is used to select a time frame (e.g., 5 days, 10 days, 2 weeks, etc.) to which to display statistics for the endpoints and the endpoint pairs. For example, when a time frame of 5 days is selected, statistics for the past 5 days will be displayed for the endpoints and the endpoint pairs in their respective section. For example, section 612 displays statistics for the endpoint Admissions ADT to CCL for the past 5 days. The statistics for this endpoint include five messages sent, four messages received, and zero errors detected when sending and/or receiving messages in the past 5 days.

The dashboards view 608 can further display the monitoring of endpoints and endpoints pairs in the same way. For example, Admissions ADT to CCL is an endpoint 612 that uses a bi-directional protocol MLLP for two-way communication at a single endpoint. Hl7sender is an endpoint pair 624 that includes two endpoints, where each endpoint uses a uni-directional protocol. As shown in the dashboards view 608, both the endpoint Admissions ADT to CCL 612 and the endpoint pair hl7sender 624 are displayed the same way, in that each occupy one section and display the same statics. When hl7sender 624 is not modeled as an endpoint pair, hl7sender would be shown as two separate endpoints, one endpoint for sending messages and another endpoint for receiving messages. The two endpoints would then be monitored and managed separately (e.g., by having their own section), and would not be viewed as a single entity. As such, the close relationship between the sending and receiving endpoints would not evident to a user performing the management and monitoring of the endpoints.

Figure 7:
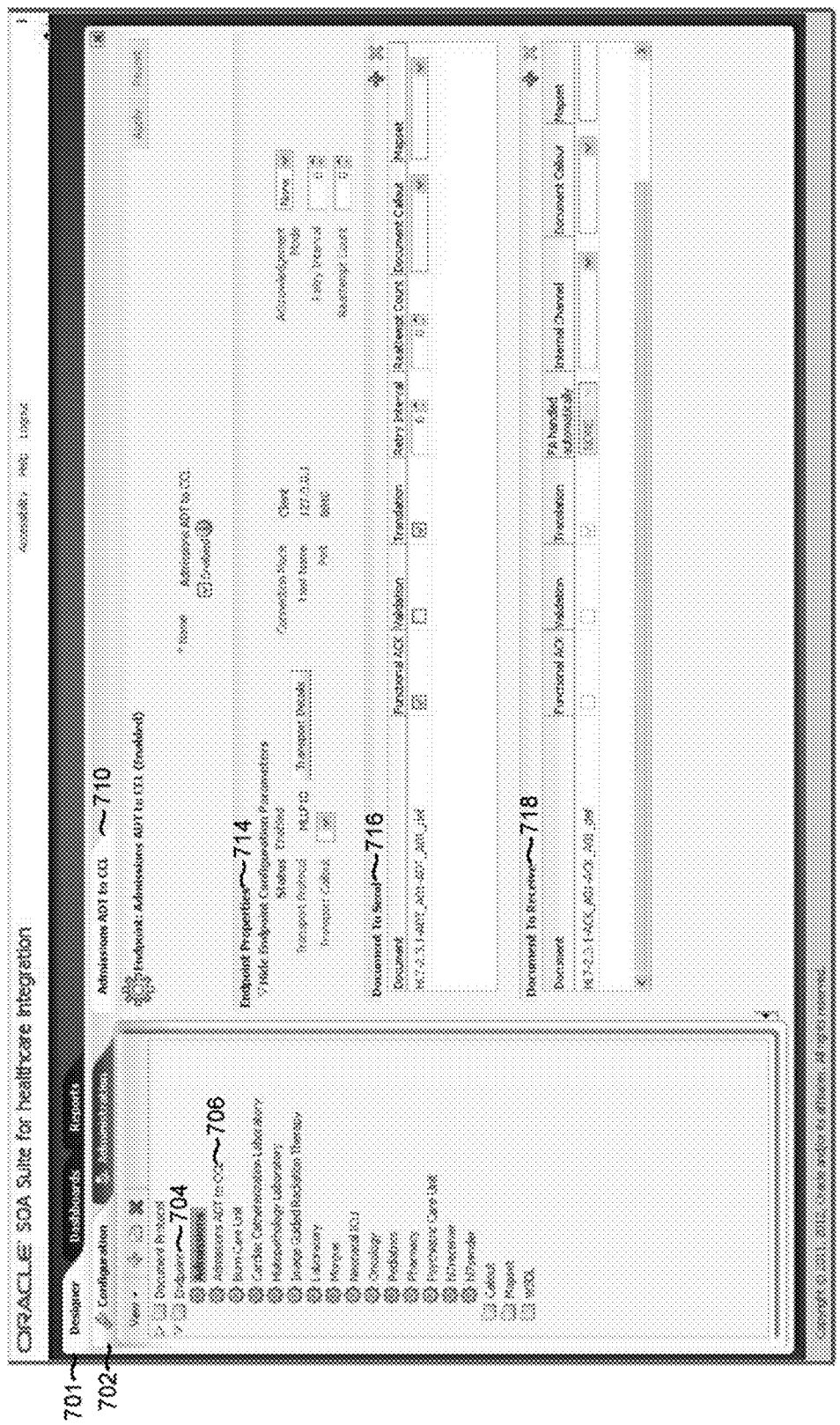
FIG. 7 shows an exemplary user interface for configuring an endpoint as a single endpoint, in accordance with an embodiment of the invention.

FIG. 7 shows an exemplary user interface for configuring an endpoint as a single endpoint, in accordance with an embodiment of the invention. As shown in FIG. 7, a designer tab 701 is selected, which displays a configuration panel 702. The configuration panel 702 includes multiple endpoints 704. When the Admissions ADT to CCL endpoint 706 is selected, the configuration parameters for the selected endpoint are shown in the endpoint pair review panel 710. The endpoint pair review panel 710 shows the configuration of the Admissions ADT to CCL endpoint as a single endpoint supporting bi-directional communication. An example of bi-directional communication is MLLP10. As shown in the endpoint pair review panel 710, the properties for the endpoint include a single set of endpoint properties 714, where the endpoint properties 714 are used for sending and receiving documents as configured in the documents to send and documents to receive sections (716, 718) of the endpoint pair review panel 710.

Figure 8:
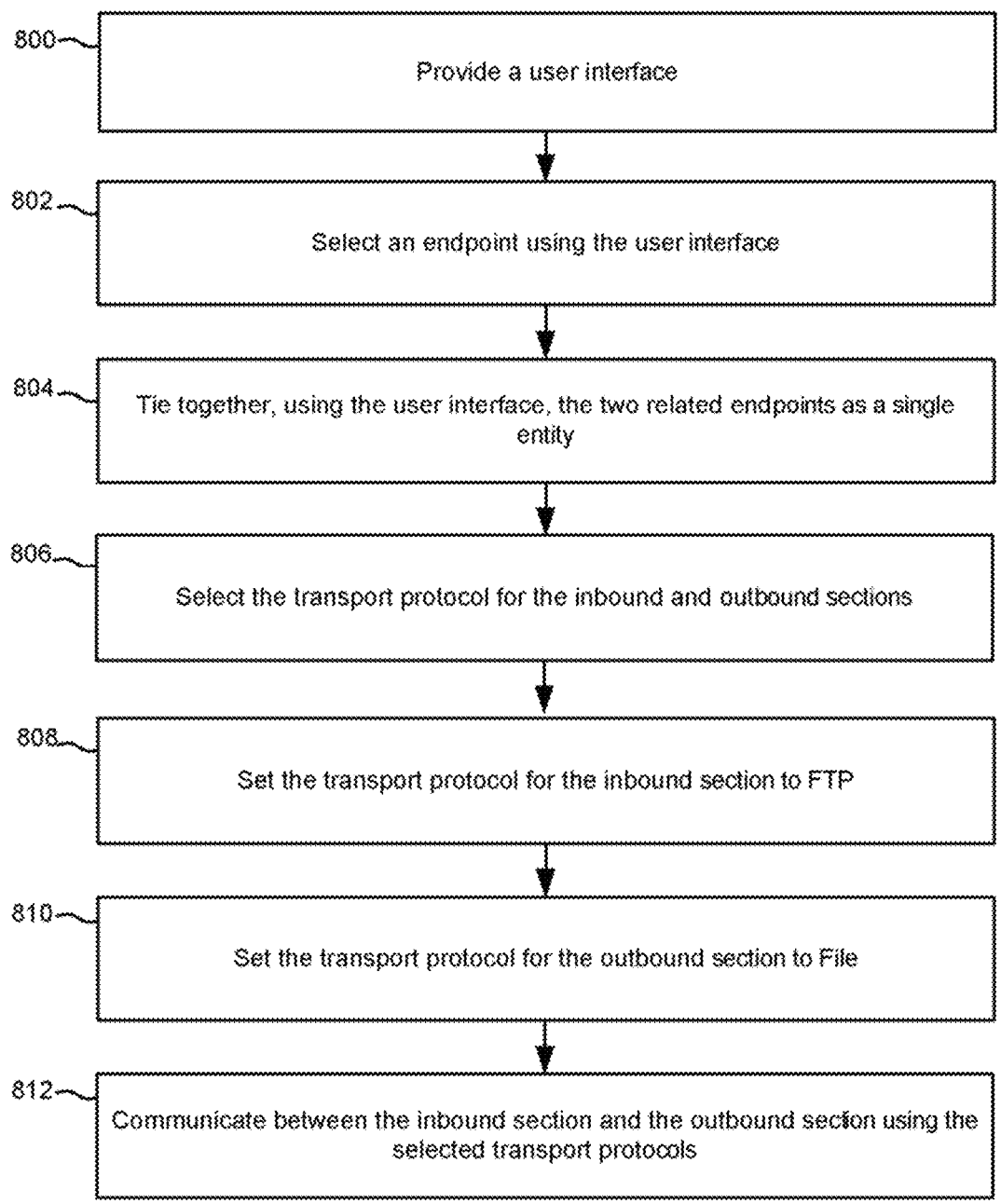
FIG. 8 shows a flowchart of a method in accordance with an embodiment of the invention, for using an interface to tie two endpoints together.

FIG. 8 shows a flowchart of a method in accordance with an embodiment of the invention, for providing an exemplary user interface for tying two endpoints together. As shown in FIG. 8, at step 800, a user interface is provided. The user interface includes a configuration panel that displays multiple endpoint pairs. At step 802, an endpoint pair is selected, and the configuration parameters for the selected endpoint pair is provided in an endpoint pair review panel. The endpoint pair review panel includes an inbound section and an outbound section, where the inbound section includes configuration parameters for sending a communication, and the outbound section includes configuration parameters for receiving a communication.

At step 804, the user interface is used to tie together the two related endpoints as a single entity by selecting an option on the user interface that enables the endpoints to operate as a single entity. As described above, when the endpoints are tied together, the endpoint pair uses a uni-directional transport protocol, and the transport protocol can be different for each endpoint. At step 806, transport buttons in the inbound and outbound sections are used to select the sending and receiving transport protocols. For example, at step 808, the user interface is used to set the transport protocol for the inbound section to FTP, and at step 810, the user interface is used to set the transport protocol for the outbound section to File. At step 812, the inbound and outbound sections communicate documents and/or other information using the selected transport protocols.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for managing and monitoring information using endpoint pairs, comprising:
   one or more computers, each computer including one or more microprocessors;
   an application server running on the one or more computers;
   a first endpoint associated with the application server, the first endpoint supporting sending a specific set of messages using a first uni-directional protocol;
   a second endpoint associated with the application server, the second endpoint supporting receiving functional acknowledgements associated with the specific set of messages using a second uni-directional protocol;
   a third endpoint associated with the application server, the third endpoint supporting sending and receiving of messages using a bi-directional protocol; and
   a user interface that allows for configuration of the first endpoint, the second endpoint, and the third endpoint;
   wherein each of the first endpoint, the second endpoint, and the third endpoint is selectively configured, using a plurality of parameters received via the user interface;
   wherein the user interface receives input selections used for selectively tying the first endpoint and the second endpoint together as an endpoint pair;
   wherein the system manages the endpoint pair as a single entity, including enabling or disabling the first and second endpoints of the endpoint pair at the same time, collectively monitoring communication of the specific set of messages sent from the first endpoint of the single entity, and collectively monitoring communication of the functional acknowledgements associated with the specific set of messages received by the second endpoint of the single entity;
   wherein the system manages the third endpoint including enabling or disabling the third endpoint, monitoring communication of another specific set of messages sent from the third endpoint, and monitoring the functional acknowledgements received by the third endpoint and associated with the another specific set of messages.

2. The system of claim 1, wherein the first and second endpoints are located on the application server.

3. The system of claim 1, wherein the first and second uni-directional protocols comprise a File Transfer Protocol (FTP) and a File protocol.

4. The system of claim 1, wherein the first and second endpoints tied together as the single entity use exclusively the first and second uni-directional transport protocols to transmit the messages between the first and second endpoints.

5. The system of claim 1, wherein the user interface comprises:
   a configuration window that displays a representation of a selected one or more of the first, second, and third endpoints; and
   a dashboard tab that comprises a graphical user interface that displays statistics for a selected one or more of the first, second or third endpoints.

6. The system of claim 1, wherein the user interface comprises an endpoint pair review panel, wherein the endpoint pair review panel comprises a section for each of the first and second endpoints.

7. The system of claim 1, wherein the plurality of parameters used for configuring the first endpoint are provided to a user to set configuration parameters for configuring the second endpoint.

8. A method for managing and monitoring information using endpoint pairs, the method comprising:
   providing an application server executing on one or more computers, each of the one or more computers comprising one or more processors;
   providing a first endpoint associated with the application, the first endpoint supporting sending a specific set of messages using a first uni-directional protocol;
   providing a second endpoint associated with the application server, the second endpoint supporting receiving functional acknowledgements associated with the specific set of messages using a second uni-directional protocol;
   providing a third endpoint associated with the application server, the third endpoint supporting sending and receiving of messages using a bi-directional protocol;
   providing a user interface that allows for a configuration of the first endpoint, the second endpoint, and the third endpoint;
   selectively configuring each of the first, second, and third endpoints with a plurality of parameters received at the user interface; and
   receiving, at the user interface, input selections used for selectively tying the first endpoint and the second endpoint together as a single endpoint pair;
   wherein the endpoint pair is managed as a single entity, including enabling or disabling the first and second endpoints of the endpoint pair at the same time, collectively monitoring communication of the specific set of messages sent from the first endpoint of the single entity, and collectively monitoring communication of the functional acknowledgements associated with the specific set of messages received by the second endpoint of the single entity;
   wherein the system manages the third endpoint including enabling or disabling the third endpoint, monitoring communication of another specific set of messages sent from the third endpoint, and monitoring the functional acknowledgements received by the third endpoint and associated with the another specific set of messages.

9. The method of claim 8, wherein the first and second endpoints are located on the application server.

10. The method of claim 8, wherein the first and second uni-directional protocols comprise a File Transfer Protocol (FTP) and a File protocol.

11. The method of claim 8, wherein the first endpoint and the second endpoint tied together as the single entity use exclusively the first and second uni-directional protocols to transmit the specific set of documents between the first and second endpoints.

12. The method of claim 8, wherein the user interface comprises:
   a configuration window that displays a representation of a selected one or more of the first, second, and third endpoints; and
   a dashboard tab that comprises a graphical user interface that displays statistics for a selected one or more of the first, second, and third endpoints.

13. The method of claim 8, the user interface comprises an endpoint pair review panel, wherein the endpoint pair review panel comprises a section for each of the first and second endpoints.

14. A non-transitory computer readable storage medium storing one or more sequences of instructions for managing and monitoring information using endpoint pairs, wherein said instructions, when executed by one or more processors, cause the one or more processors to execute steps comprising:
   providing an application server running on the one or more processors;
   providing a first endpoint associated with the application server, the first endpoint supporting sending or a specific set of messages using a first uni-directional protocol;
   providing a second endpoint associated with the application server, the second endpoint supporting receiving functional acknowledgements associated with the specific set of messages using a second uni-directional protocol;
   providing a third endpoint associated with the application server, the third endpoint supporting sending and receiving of messages using a bi-directional protocol;
   providing a user interface that allows for a configuration of the first endpoint, the second endpoint, and the third endpoint;
   selectively configuring each of the first, second, and third endpoints with a plurality of parameters received at the associated interface;
   receiving, at the user interface, input selections used for selectively tying the first endpoint and the second endpoint together as an endpoint pair; and
   managing the endpoint pair as a single entity, including enabling or disabling the first and second endpoints of the endpoint pair at the same time, collectively monitoring communication of the specific set of messages sent from the first endpoint of the single entity, and collectively monitoring communication of the functional acknowledgements associated with the specific set of messages received by the second endpoint of the single entity;
   managing the third endpoint including enabling or disabling the third endpoint, monitoring communication of another specific set of messages sent from the third endpoint, and monitoring the functional acknowledgements received by the third endpoint and associated with the another specific set of messages.

15. The system of claim 1, wherein:
   the specific set of messages and/or the functional acknowledgements associated with the specific set of messages comprise Health Level 7 (HL7) documents and/or HL7 functional acknowledgements corresponding to the HL7 documents.

16. The method of claim 8, wherein:
   the specific set of messages and/or the functional acknowledgements associated with the specific set of messages comprise Health Level 7 (HL7) documents and/or HL7 functional acknowledgements corresponding to the HL7 documents.

17. The non-transitory computer readable storage medium of claim 14, wherein:
   the specific set of messages and/or the functional acknowledgements associated with the specific set of messages comprise Health Level 7 (HL7) documents and/or HL7 functional acknowledgements corresponding to the HL7 documents.

18. The non-transitory computer readable storage medium of claim 14, wherein the user interface comprises:
   a configuration window that displays a representation of a selected one or more of the first, second, and third endpoints; and
   a dashboard tab that comprises a graphical user interface that displays statistics for a selected one or more of the first, second or third endpoints.

19. The non-transitory computer readable storage medium of claim 14, wherein the user interface comprises an endpoint pair review panel, wherein the endpoint pair review panel comprises a section for each of the first and second endpoints.

20. The non-transitory computer readable storage medium of claim 14, wherein the first and second uni-directional protocols comprise a File Transfer Protocol (FTP) and a File protocol.

21. The system according to claim 1, wherein:
   the first endpoint is configured to send the specific set of documents using exclusively a first uni-directional protocol; and
   the second endpoint is configured to receive the specific set of documents using exclusively a second uni-directional protocol different than the first uni-directional protocol.

22. The system of claim 1, wherein the first uni-directional protocol supported by the first endpoint is the same as the second uni-directional protocol supported by the second endpoint.

23. The system of claim 5, wherein the configuration window of the user interface displays the representation of the selected one or more of the first, second, and third endpoints in the same way.

24. The system of claim 5, wherein the graphical user interface of the dashboard tab selectively displays, for each of the first, second, and third endpoints, one or more of: a number of messages sent statistic, a number of messages received statistic, a number of errors in sending messages statistic, a number of errors in receiving messages statistic, an average number of messages sent statistic and/or an average number of messages received statistic.

25. The method of claim 8, further comprising displaying the representation of the selected one or more of the first, second, and third endpoints in the configuration window of the user interface in the same way.

26. The method of claim 8, further comprising selectively displaying for each of the first, second, and third endpoints, in the graphical user interface of the dashboard tab, one or more of: a number of messages sent statistic, a number of messages received statistic, a number of errors in sending messages statistic, a number of errors in receiving messages statistic, an average number of messages sent statistic and/or an average number of messages received statistic.

* * * * *

UNITED STATES PATENT AND TRADEMARK OFFICE
CERTIFICATE OF CORRECTION

PATENT NO. : 9,531,787 B2
APPLICATION NO. : 13/523757
DATED : December 27, 2016
INVENTOR(S) : Yau Page 1 of 1

It is certified that error appears in the above-identified patent and that said Letters Patent is hereby corrected as shown below:

In the Drawings

On sheet 8 of 8, in FIGURE 8, under Reference Numeral 812, Line 1, delete "Secton" and insert -- section --, therefor.

In the Specification

In Column 3, Line 59, after "pair" insert -- . --.

In Column 4, Line 55, delete "and or" and insert -- and/or --, therefor.

In the Claims

In Column 9, Line 33, in Claim 14, after "sending" delete "or".

Signed and Sealed this
Twentieth Day of June, 2017

Joseph Matal
*Performing the Functions and Duties of the
Under Secretary of Commerce for Intellectual Property and
Director of the United States Patent and Trademark Office*